(12) United States Patent
Kosik et al.

(10) Patent No.: US 12,552,546 B2
(45) Date of Patent: Feb. 17, 2026

(54) GAZE-ASSISTED VERIFICATION OF PILOT ACTIVITIES

(71) Applicant: HONEYWELL INTERNATIONAL s.r.o., Prague (CZ)

(72) Inventors: Michal Kosik, Dolny Kubin (SK); Richard Granec, Spisska Nova Ves (SK); Sergij Cernicko, Brno (CZ)

(73) Assignee: HONEYWELL INTERNATIONAL S.R.O, Charlotte, NC (US)

( * ) Notice: Subject to any disclaimer, the term of this patent is extended or adjusted under 35 U.S.C. 154(b) by 85 days.

(21) Appl. No.: 18/678,279

(22) Filed: May 30, 2024

(65) Prior Publication Data

US 2025/0368350 A1    Dec. 4, 2025

(51) Int. Cl.
*B64D 45/00* (2006.01)
*B64D 43/00* (2006.01)
(Continued)

(52) U.S. Cl.
CPC ............. *B64D 45/00* (2013.01); *B64D 43/00* (2013.01); *G06V 40/19* (2022.01); *G06V 40/20* (2022.01)

(58) Field of Classification Search
CPC ........ B64D 45/00; B64D 43/00; G06V 40/19; G06V 40/20
(Continued)

(56) References Cited

U.S. PATENT DOCUMENTS 9,227,736 B2    1/2016   Whitlow et al.
10,399,695 B2   9/2019   Ouellette et al.
(Continued)

FOREIGN PATENT DOCUMENTS

DE    102015111909 A1    1/2017

OTHER PUBLICATIONS

Thomay Christian et al: "Taking Off: Towards Real Competence-Based Flight Pilot Training", 2019 17th International Conference on Emerging Elearning Technologies and Applications (ICETA), IEEE, Nov. 21, 2019 (Nov. 21, 2019), pp. 764-769, XP033743446, DOI: 10.1109/ICETA48886.2019.9040147 [retrieved on Mar. 17, 2020] figures 1-7 p. 764, left-hand column, line 1—p. 769, right-hand column, line 7.

(Continued)

*Primary Examiner* — Omar CasillasHernandez
(74) *Attorney, Agent, or Firm* — Ingrassia Fisher & Lorenz LLP

(57) ABSTRACT

A system and method for verification of a pilot's activities in an aircraft cockpit has been developed. The system includes a camera located in the aircraft cockpit that monitors the pilot's eye position, head position and direction of gaze in the cockpit during aircraft operations. A computer system is located onboard the aircraft has a retrievable electronic memory that stores a three-dimensional (3D) model of the aircraft cockpit. The 3D model of the aircraft cockpit includes the location of aircraft instrumentation indicators. The retrievable electronic memory also stores a database of visual taskings for the pilot. The computer system determines the completion of the visual taskings for the pilot by comparing the pilot's eye and head position and gaze direction with location of relevant aircraft instrumentation indicators and a notification system that alerts the pilot when a visual tasking is not completed.

18 Claims, 4 Drawing Sheets

(51) Int. Cl.
  *G06V 40/19* (2022.01)
  *G06V 40/20* (2022.01)
(58) Field of Classification Search
  USPC .......................................................... 340/945
  See application file for complete search history.

(56) References Cited

U.S. PATENT DOCUMENTS

| | | |
|---|---|---|
| 10,766,632 B2 | 9/2020 | Le Provost et al. |
| 11,847,858 B2 | 12/2023 | Arora et al. |
| 2011/0106447 A1* | 5/2011 | Wise ...................... G02B 27/01 |
| | | 701/431 |
| 2016/0009411 A1 | 1/2016 | Davalos et al. |
| 2020/0143699 A1* | 5/2020 | Pashayev ............... G09B 9/307 |
| 2022/0146372 A1* | 5/2022 | Fricker .............. G01M 11/0264 |
| 2022/0230522 A1* | 7/2022 | Myers ...................... A61B 5/18 |
| 2022/0392261 A1 | 12/2022 | George et al. |
| 2023/0334788 A1 | 10/2023 | Zohni |

OTHER PUBLICATIONS

Li Wen-Chin et al: "Visual scan patterns reflect to human-computer interactions on processing different types of messages in the flight deck", International Journal of Industrial Ergonomics, Elsevier, Amsterdam, NL, vol. 72, Apr. 28, 2019 (Apr. 28, 2019), pp. 54-60, XP085751567, ISSN: 0169-8141, DOI: 10. 1016/J.ERGON.2019. 04.003 [retrieved on Apr. 28, 2019] abstract; figures 1-8 p. 55, left-hand column, line 1—p. 59, right-hand column, line 21.

* cited by examiner

GAZE-ASSISTED VERIFICATION OF PILOT ACTIVITIES

STATEMENT REGARDING GOVERNMENTALLY SPONSORED RESEARCH OR DEVELOPMENT

The project leading to this application has received funding from the Clean Sky 2 Joint Undertaking (JU) under grant agreement No 945583. The JU receives support from the European Union's Horizon 2020 research and innovation programme and the Clean Sky 2 JU members other than the Union.

TECHNICAL FIELD

The present invention generally relates to aircraft operations, and more particularly relates to gaze assisted verification of pilot activities.

BACKGROUND

During a flight, pilots need to follow many listed and unlisted procedures and checklists, many of which require a visual check of a specific item (e.g., monitoring fuel level, checking surroundings for potential dangers, etc.). Additionally, they need to visually monitor (either on a regular basis or constantly) several systems as well as the situation in and around the aircraft. It is easy to skip a visual check without realizing the omission especially in a high workload situation. Hence, there is a need for a gaze assisted verification of pilot activities.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system is provided for verification of a pilot's activities in an aircraft cockpit. The system comprises: a camera that monitors the pilot's eye and head position during aircraft operations, where the camera is located in the aircraft cockpit; a computer system located onboard the aircraft, comprising, a three-dimensional (3D) model of the aircraft cockpit that is stored in a retrievable electronic memory, where the 3D model of the aircraft cockpit includes the location of aircraft instrumentation indicators, a database of visual taskings for the pilot, where the computer system determines the completion of the visual taskings for the pilot by comparing the pilot's eye and head position with location of relevant aircraft instrumentation indicators; and a notification system that alerts the pilot when a visual tasking is not completed.

A method is provided for verification of a pilot's activities in an aircraft cockpit. The method comprises: monitoring the pilot's eye and head position with a camera during aircraft operations, where the camera is located in the aircraft cockpit; determining the completion of visual taskings for the pilot by comparing the pilot's eye and head position with location of relevant aircraft instrumentation indicators with a computer system located onboard the aircraft, where the computer system accesses a database of visual taskings for the pilot, and a three-dimensional (3D) model of the aircraft cockpit that is stored in a retrievable electronic memory, where the 3D model of the aircraft cockpit includes the location of aircraft instrumentation indicators; and alerting the pilot with a notification system when a visual tasking is not completed.

Furthermore, other desirable features and characteristics of the disclosed embodiments will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A system and method for verification of a pilot's activities in an aircraft cockpit has been developed. The system includes a camera located in the aircraft cockpit that monitors the pilot's eye and head position during aircraft operations. A computer system is located onboard the aircraft has a retrievable electronic memory that stores a three-dimensional (3D) model of the aircraft cockpit. The 3D model of the aircraft cockpit includes the location of aircraft instrumentation indicators. The retrievable electronic memory also stores a database of visual taskings for the pilot. The computer system determines the completion of the visual taskings for the pilot by comparing the pilot's eye and head position with location of relevant aircraft instrumentation indicators and a notification system that alerts the pilot when a visual tasking is not completed.

Figure 1:
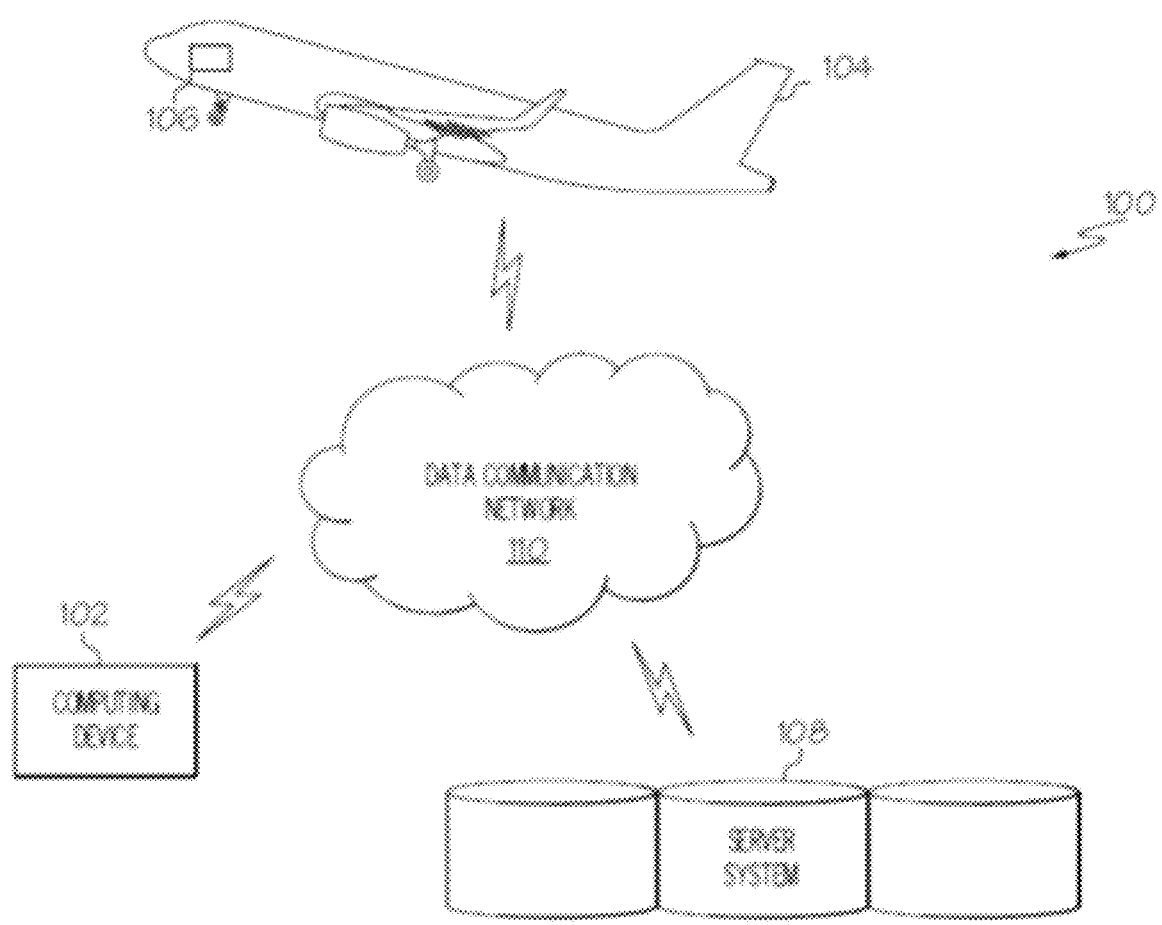
FIG. 1 is a diagram of aircraft computer system 100, in accordance with the disclosed embodiments.

Turning now to the figures, FIG. 1 is a diagram of aircraft computer system 100, in accordance with the disclosed embodiments. The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing Electronic Flight Bag (EFB) applications. In other embodiments, the computing device 102 may be implemented using a computer system onboard the aircraft 104.

The aircraft 104 may be implemented as an airplane, helicopter, spacecraft, hovercraft, or the like. The one or more avionics systems 106 may include a Flight Management System (FMS), navigation devices, weather detection devices, radar devices, communication devices, brake systems, and/or any other electronic system or avionics system used to operate the aircraft 104. Data obtained from the one or more avionics systems 106 may include, without limitation: flight data, aircraft heading, aircraft speed, aircraft position, altitude, descent rate, position of air spaces surrounding a current flight plan, activity of air spaces surrounding a current flight plan, or the like.

The server system 108 may include any number of application servers, and each server may be implemented using any suitable computer. In some embodiments, the server system 108 includes one or more dedicated computers. In some embodiments, the server system 108 includes one or more computers carrying out other functionality in addition to server operations. The server system 108 may store and provide any type of data. Such data may include, without limitation: flight plan data, aircraft parameters, avionics data and associated user actions, and other data compatible with the computing device 200.

The computing device 102 is usually located onboard the aircraft 104, and the computing device 102 communicates with the one or more avionics systems 106 via wired and/or wireless communication connection. The computing device 102 and the server system 108 may both be located onboard the aircraft 104. In other embodiments, the computing device 102 and the server system 108 may be disparately located, and the computing device 102 communicates with the server system 108 via the data communication network 110 and/or via communication mechanisms onboard the aircraft 104.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

Figure 2:
FIG. 2 is a functional block diagram of a computing device 200, in accordance with the disclosed embodiments.
Figure 2:
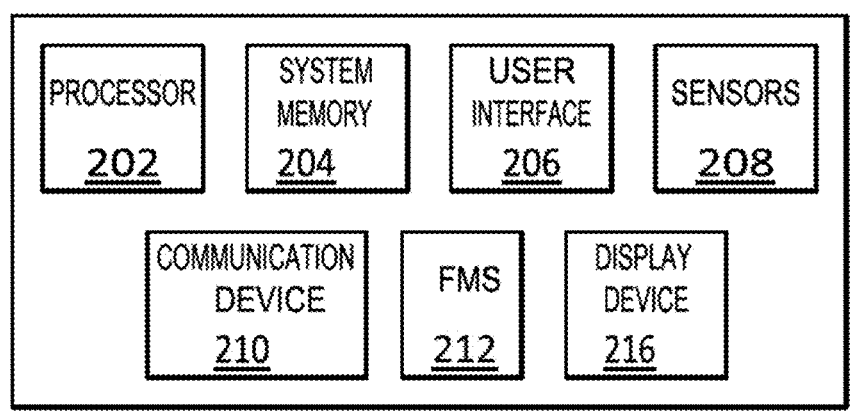

FIG. 2 is a functional block diagram of a computing device 200, in accordance with the disclosed embodiments. It should be noted that the computing device 200 can be implemented with the computing device 102 depicted in FIG. 1. In this regard, the computing device 200 shows certain elements and components of the computing device 102 in more detail.

The computing device 200 generally includes, without limitation: a processor 202; system memory 204; a user interface 206; a plurality of sensors 208; a communication device 210; a flight management system (FMS) 212; and a display device 216. These elements and features of the computing device 200 may be operatively associated with one another, coupled to one another, or otherwise configured to cooperate with one another as needed to support the desired functionality. For case of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that are described in more detail below.

The processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 202 may be realized as one or more microprocessors, controllers, microcontrollers, or state machines. Moreover, the processor 202 may be implemented as a combination of computing devices, e.g., a combination of digital signal processors and microprocessors, a plurality of microprocessors, one or more microprocessors in conjunction with a digital signal processor core, or any other such configuration.

The processor 202 is communicatively coupled to the system memory 204. The system memory 204 is configured to store any obtained or generated data associated with generating alerts to redirect user attention from the computing device 200 to a critical or high-priority flight situation. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the processor 202 such that the processor 202 can read information from, and write information to, the system memory 204. In the alternative, the system memory 204 may be integral to the processor 202. As an example, the processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to provide flight data parameters during the operation of electronic flight bag (EFB) applications, as described herein.

In certain embodiments, the user interface 206 may include or cooperate with various features to allow a user to interact with the computing device 200 via graphical elements rendered on a display element (e.g., the display device 216). Accordingly, the user interface 206 may initiate the creation, maintenance, and presentation of a graphical user interface (GUI). In certain embodiments, the display device 216 implements touch-sensitive technology for purposes of interacting with the GUI. Thus, a user can manipulate the GUI by moving a cursor symbol rendered on the display device 216, or by physically interacting with the display device 216 itself for recognition and interpretation, via the user interface 206.

The plurality of sensors 208 is configured to obtain data associated with active use of the computing device 200, and may include, without limitation: touchscreen sensors, accelerometers, gyroscopes, or the like. In the embodiments disclosed herein, the sensors include a camera located in the aircraft cockpit that monitors the pilot's eye and head position during aircraft operations. The Camera may also be accompanied by a sensor capable of detecting pilot's distance from the camera. This information is needed to properly calculate where the pilot is looking. Some embodiments of the computing device 200 may include one particular type of sensor, and some embodiments may include a combination of different types of sensors. Generally, the plurality of sensors 208 provides data indicating whether the computing device 200 is currently being used. Touchscreen sensors may provide output affirming that the user is currently making physical contact with the touchscreen (e.g., a user interface 206 and/or display device 216 of the computing device 200), indicating active use of the computing device. Accelerometers and/or gyroscopes may provide output affirming that the computing device 200 is in motion, indicating active use of the computing device 200.

The communication device 210 is suitably configured to communicate data between the computing device 200 and one or more remote servers and one or more avionics systems onboard an aircraft. The communication device 210 may transmit and receive communications over a wireless local area network (WLAN), the Internet, a satellite uplink/downlink, a cellular network, a broadband network, a wide area network, or the like. As described in more detail below, data received by the communication device 210 may include, without limitation: avionics systems data and aircraft parameters (e.g., a heading for the aircraft, aircraft speed, altitude, aircraft position, ascent rate, descent rate, a current flight plan, a position of air spaces around a current flight plan, and activity of the air spaces around a current flight plan), and other data compatible with the computing device 200. Data provided by the communication device 210 may include, without limitation, requests for avionics systems data, alerts and associated detail for display via an aircraft onboard display, and the like.

The display device 216 is configured to display various icons, text, and/or graphical elements associated with alerts related to situations requiring user attention, wherein the situations are associated with a device or system that is separate and distinct from the computing device 200. In an exemplary embodiment, the display device 216 and the user interface 206 are communicatively coupled to the processor 202. The processor 202, the user interface 206, and the display device 216 are cooperatively configured to display, render, or otherwise convey one or more graphical representations or images associated with high-priority or critical flight situation alerts on the display device 216, as described in greater detail below. In an exemplary embodiment, the display device 216 is realized as an electronic display configured to graphically display critical flight situation alerts and associated detail, as described herein. In some embodiments, the computing device 200 is an integrated computer system onboard an aircraft, and the display device 216 is located within a cockpit of the aircraft, and is thus implemented as an aircraft display. In other embodiments, the display device 216 is implemented as a display screen of a standalone, personal computing device (e.g., laptop computer, tablet computer). It will be appreciated that although the display device 216 may be implemented using a single display, certain embodiments may use additional displays (i.e., a plurality of displays) to accomplish the functionality of the display device 216 described herein.

Failure to check surroundings and important systems whether as part of a checklist or as a required regular basis, is a high safety risk for an aircraft. With the current trends on reduced crew operations and single pilot operations, there will be even more pressure on the pilot in the cockpit to not to miss anything important and to keep a perfect awareness of the aircraft's systems, its surroundings, and the mission. The pilot must be able to detect any deviations early. A supporting system that is able to detect the pilot omitting a visual check can be a great help to achieve this goal.

In response, a "gaze-assisted verification of pilot activities system" has been developed and is disclosed herein. Embodiments are able to monitor where pilot is looking and has been looking in the recent past and unobtrusively provide notification if the pilot: checked an electronic checklist item requiring a visual check without actually performing it; did not check a system/area marked for regular visual checks in a past time period (including cumulative check); and stopped looking at a system/area marked for a continuous monitoring. Embodiments work for both 2-pilot crews as well as in a single pilot cockpits. In both cases, it offers an additional layer of safety to ensure that pilot(s) monitor all required systems and have a full and up-to-date awareness of the state of important systems and surroundings. In case of a single pilot operations (or a reduced crew operations), it will also help to enable the transformation from two pilot crews to a single pilot in the cockpit. Disclosed embodiments have the advantage of non-intrusively monitoring pilot activities that are difficult to monitor otherwise.

Figure 3:
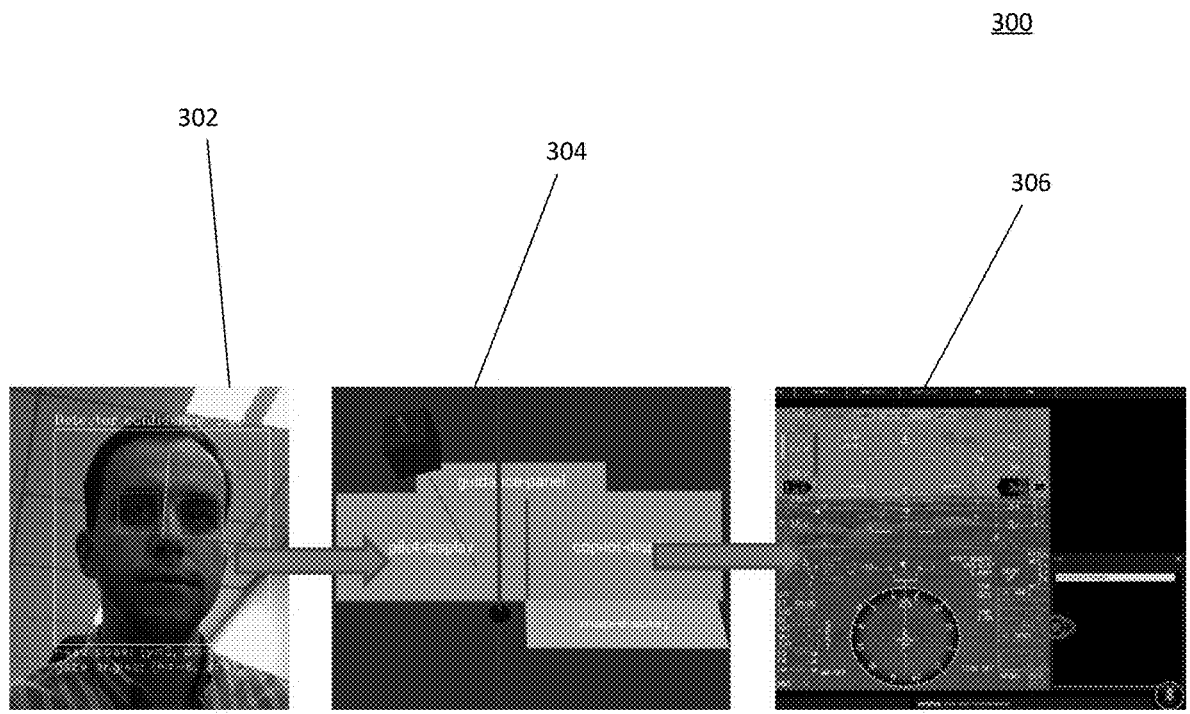
FIG. 3 shows block diagrams of a system for verification of a pilot's activities in an aircraft cockpit, in accordance with the disclosed embodiments.

Turning now to FIG. 3, block diagrams 300 are shown of a system for verification of a pilot's activities in an aircraft cockpit, in accordance with the disclosed embodiments. In this embodiment, a camera located in the aircraft cockpit monitors the pilot's eye and head position (expressed as a three dimensional position) 302 during aircraft operations. A three-dimensional (3D) model of the aircraft cockpit 304 which includes the location of aircraft instrumentation, is stored in a retrievable electronic memory of a computer system. The computer system determines the completion of the visual taskings for the pilot by comparing the pilot's eye and head position with location of relevant aircraft instrumentation indicators 306. By way of example, the instrumentation indicator 306 has an eye diagram drawn in the bottom-right part of the display. This is to indicate where the system detected the pilot is looking. This depiction is just a visual cue for better understanding in the figure and it is not part of what is actually shown on the display.

This system is capable of detecting where the pilot is looking in real-time and compares the information with where the pilot is supposed to look based on an electronic checklist in some embodiments. The electronic checklist is retrieved from a database of visual taskings for the pilot. In addition, the system also contains a history of where the pilot has looked in the past several and for how long. Based on this information, the system is able to notify pilot if they deviate from the expected behavior. This notification does not prevent the pilot from continuing their current activity (e.g., electronic checklist items are still checked, but display a notification that the checklist were checked without the pilot looking at the system/display/window/area), it only serves as a notification that a deviation was detected.

More specifically, some embodiments of the system implementing these embodiments include three distinct segments. First, one or more cameras are used to capture the pilot's head and eye position along with an optional depth camera. Other suitable optical detection devices may be used to calculate the distance of pilot's head and eyes can be used in other embodiments. Second, a 3D model of the cockpit that corresponds to the physical cockpit (a "digital twin") is used as a reference for the data from the camera with respect to the pilot's head and eye position. The individual displays and panels of the cockpit model shall be identified and labeled (e.g., displays, guidance panel, overhead panel, HUD display, cockpit windows). The level of details of the labeling may vary based on need. In some instances, rough labeling and identification may be sufficient (e.g., "guidance panel"). In other cases, more detailed information may be required (e.g., individual buttons, switches, and displays on the guidance panel). Third, a system database containing the checklists is referenced to identify the required checks for the pilot along with the related requirements. The checklists are the compared to the pilot's head and eye position and corresponding location of relevant instruments in the 3D model.

The specific checklist requirements may vary and include various types of actions. For example, a "quick glance" requires the pilot to stop their gaze at the expected location for a moment and then they can continue looking elsewhere (i.e., the eye movement has to stop in the expected area and then may continue in another direction). A "firm-stop look" requires the pilot to look at the expected location for at least minimum time period. The duration of the time period can be different for each task and its content can be set or calculated according to the present conditions. Optionally, the pilot can move their gaze across individual parts of a location (e.g., look at several waypoints on the navigation display) and does not need to get "stuck" on a single element. A "standard check" requires the pilot to look at the expected location at least once in the past time period. A "regular check" requires the pilot has to look at the expected location at least once every defined time period. A "cumulative duration check" requires the pilot to look at the expected location for at least a certain time duration in the past time window. For example, if the pilot needs to look at a display for at least 20 seconds in the past minute, they can do it by looking at the display for 10 seconds, then looking somewhere else for 30 seconds and then looking at the display for additional 10 seconds. This meets the requirement of looking at the display for a cumulative 20 seconds in the past minute. A "continuous look" requires the pilot to look at the expected location continuously (e.g., a monitoring activity). However, a short glance elsewhere may be allowed.

If a checklist requirement is not met, the pilot(s) is notified of the deficiency via a notification system. To better inform the pilot of the deficiency, this notification can be: a textual note; an aural sound or message; a highlighted frame around the relevant area on the display; a flashing of non-display controls; and a highlighted area showing on a model of the cockpit. To clear a notification, the pilot may either: look at the specified area; wait for a specified time period; provide a verbal acknowledgement of the notification; press a dedicated button; or any combination of these approaches.

In other embodiments, certain circumstances may allow specific behaviors. For example, "multiple visual checks" for multiple areas in the cockpit multiple times (e.g., looking out of the cockpit windows), the pilot may check any of the windows in order for this invention to mark it as visually checked. In other cases, the pilot needs to look at a specific instance (e.g., looking out of left window) to mark the task as visually checked. In another example, in a 2-pilot cockpit the second pilot may be notified if the first pilot who is supposed to look at a designated area is not responding to any notifications.

The system has the following advantages: acts as a pilot assistant by helping to keep track of system checklists; reduces a risk of a shift of pilot's focus by providing a notification as soon as a focus shift occurs; helps prevent the pilot from checking a checklist item without a previous visual revision; helps the pilots to follow unlisted procedures and checklists that are scheduled regularly (e.g., checking fuel every X minutes), but can be unintentionally omitted, especially during long, uneventful flights. In summary, the system increases situational awareness and flight safety by reducing human error. This enables reduced crew operations and single pilot operations while ensuring that the pilot has a high level of situational awareness. It is important to note that although this invention's use is described in a cockpit environment, it is not limited to aviation, but can be used in others situations where the user needs to keep awareness while they also needs to visually cover a greater area (e.g., UAM/ground station operator or air traffic controller, more generally in an office environment, driving a vehicle, working with multiple monitors).

Figure 4:
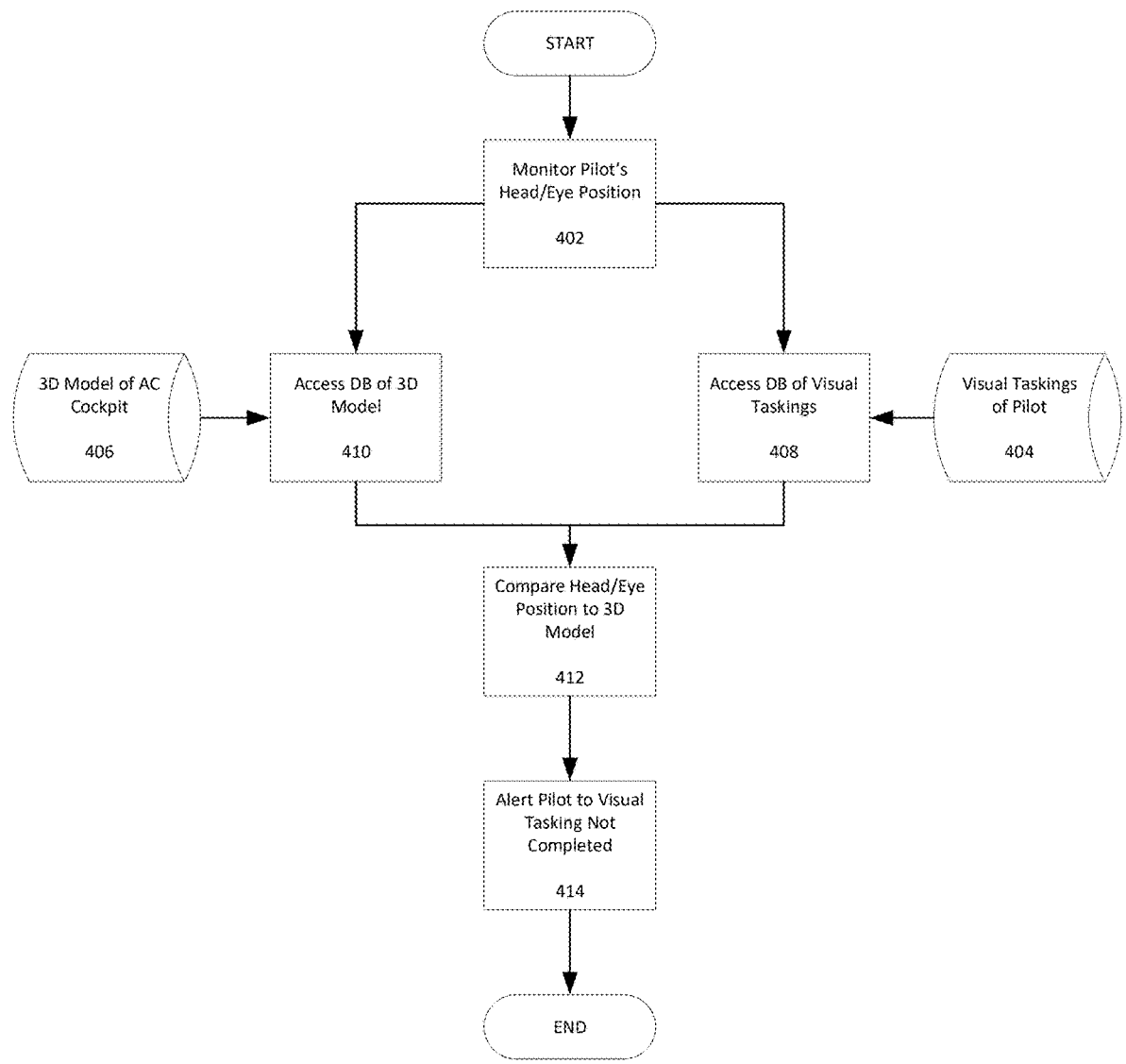
FIG. 4 shows a flowchart 400 for a method of verification of a pilot's activities in an aircraft cockpit, in accordance with the disclosed embodiments.

Turning now to FIG. 4, a flowchart 400 is shown for a method of verification of a pilot's activities in an aircraft cockpit. The method monitors the pilot's eye and head position 402 with a camera during aircraft operations. The camera is located in the aircraft cockpit. An onboard computer system accesses 408 a database of visual taskings for the pilot 404, and also accesses a three-dimensional (3D) model 410 of the aircraft cockpit that is stored in a retrievable database 406. The 3D model of the aircraft cockpit includes the location of aircraft instrumentation indicators. The completion of visual taskings for the pilot is then determined by comparing the pilot's eye and head position with location of relevant aircraft instrumentation indicators 412 with the computer system. This is accomplished by calculating an intersection of the pilot's gaze direction (i.e, arrows going from pilot's eyes) and the 3D model of the cockpit. If the gaze direction crosses any labeled item (e.g., the monitor in the 3D model), the pilot is looking at the labeled item and it is compared with where the location the pilot is supposed to look. A notification system alerts the pilot 414 when a visual tasking is not completed. In alternative embodiments, the method may use an FMS as the computer system to access the databases and determine completion of visual taskings. Other systems may be added to facilitate the usage of the FMS.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for verification of a pilot's activities in an aircraft cockpit, comprising:
   a camera that monitors the pilot's eye position, head position and direction of gaze in the cockpit during aircraft operations, where the camera is located in the aircraft cockpit;
   a computer system located onboard the aircraft, comprising,
      a three-dimensional (3D) model of the aircraft cockpit that is stored in a retrievable electronic memory, where the 3D model of the aircraft cockpit includes the location of aircraft instrumentation indicators,
      a database of visual taskings for the pilot, where the computer system determines the completion of the visual taskings for the pilot by comparing the pilot's eye and head position with location of relevant aircraft instrumentation indicators; and
   a notification system that alerts the pilot when a visual tasking is not completed.

2. The system of claim 1, where the visual taskings comprise an electronic checklist.

3. The system of claim 1, where the visual taskings comprise a continuous visual monitoring of a specified area.

4. The system of claim 1, where the visual taskings comprise a visual check of a specified area.

5. The system of claim 4, where the visual check of a designated system area comprises a single visual look at the designated system area.

6. The system of claim 4, where the visual check of a designated system area comprises a visual look at the designated system area for a specified period of time.

7. The system of claim 4, where the visual check of a designated system area comprises a repeated visual look at the designated system area on a periodic basis.

8. The system of claim 1, where the completion of visual taskings for the pilot requires a single look from the pilot.

9. The system of claim 1, where the completion of visual taskings for the pilot requires a look from the pilot for a designated period of time.

10. The system of claim 1, where the completion of visual taskings for the pilot requires a single look within a designated window of time.

11. The system of claim 1, where the completion of visual taskings for the pilot requires multiple looks for a cumulative amount of time within a designated window of time.

12. The system of claim 1, where the completion of visual taskings for the pilot requires continuous monitoring by the pilot within a designated window of time.

13. The system of claim 1, where the alerts comprise a textual notification.

14. The system of claim 1, where the alerts comprise an aural notification.

15. The system of claim 1, where the alerts comprise an illuminated frame around a designated area on a flight display.

16. The system of claim 1, where the alerts comprise a flashing notification of the cockpit controls.

17. The system of claim 1, where the camera monitors a co-pilot's eye and head position in addition to the pilot's eye and head position.

18. A method for verification of a pilot's activities in an aircraft cockpit, comprising:

monitoring the pilot's eye position, head position and direction of gaze in the cockpit during aircraft operations, where the camera is located in the aircraft cockpit;

determining the completion of visual taskings for the pilot by comparing the pilot's eye and head position with location of relevant aircraft instrumentation indicators with a computer system located onboard the aircraft, where the computer system accesses
- a database of visual taskings for the pilot, and
- a three-dimensional (3D) model of the aircraft cockpit that is stored in a retrievable electronic memory, where the 3D model of the aircraft cockpit includes the location of aircraft instrumentation indicators; and alerting the pilot with a notification system when a visual tasking is not completed.

* * * * *